INVENTORS:
IRWIN BERMAN, BHARAT S. THAKKAR
JOSEPH W. SCHROEDER, HERMAN P. SMITH

BY Richard S. Shreve, Jr.

ATTORNEY 3,543,370
METHOD AND APPARATUS FOR EXPLOSIVELY FORMING A TUBE WITHIN A TUBE SHEET
Irwin Berman, Bronx, N.Y., and Bharat S. Thakkar, Carteret, Joseph W. Schroeder, Clark, Union, and Herman P. Smith, Bound Brook, N.J., assignors to Foster Wheeler Corporation, Livingston, N.J., a corporation of New York
Filed May 8, 1968, Ser. No. 727,531
Int. Cl. B23p 17/00
U.S. Cl. 29—157.4                                        6 Claims

ABSTRACT OF THE DISCLOSURE

Cylindrical explosive insert surrounded by annular polyethylene force transmitter having a conical portion making a narrow ring of contact with the inside surface of the tube.

BACKGROUND

It is desirable to create a pressure seal between the tube and tube sheet for low pressure feedwater heaters or tubes into headers or boiler drums by means of narrow rings of contact. It has been proposed to provide annular grooves in the tube sheet hole, and so expand the tube to enter the grooves, but this has not been satisfactory. It has also been proposed to use a ring charge of explosive, but the ring charge is difficult to ignite, particularly in small sizes.

SUMMARY

According to the present invention a cylindrical explosure insert is surrounded by an annular tubular force transmitting portion of polyethylene or the like, having an enlarged concentric portion making a narrow ring of contact with the inside surface of a tube inserted in the hole of a tube sheet. Preferably the enlarged portion is conical, having a base substantially radial, and the sides of the cone make an obtuse angle of about 150° with the remainder of said tubular portion at the smaller end of the cone.

Figure 1:
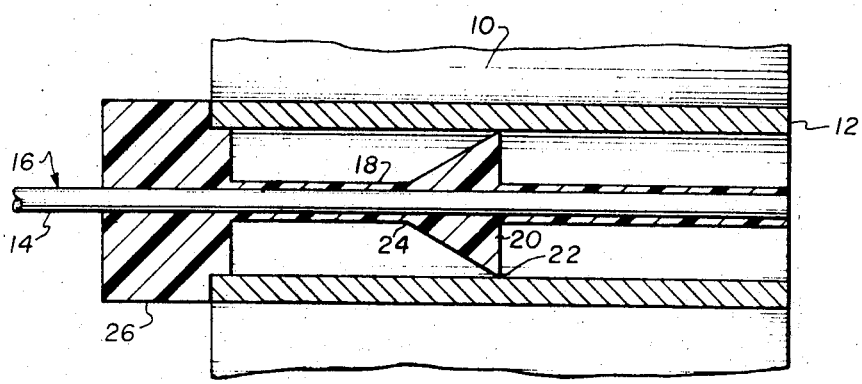
Figure 2:
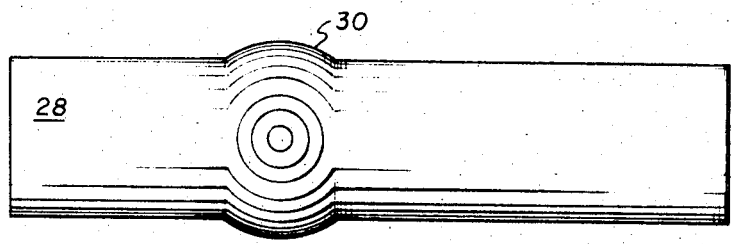

In the drawing:
FIG. 1 is a longitudinal section through a tube and tube sheet with apparatus according to, and for carrying out the method of the present invention, and
FIG. 2 is a diagrammatic representation of the expansion of the tube.

As shown in the drawing, a tube sheet 10 has a base receiving a tube 12.

For generating an explosive force an insert 14 has an external diameter by which it can be inserted into the tube, and a length so that when it is positioned within the tube, the insert is at least substantially coextensive with the area of overlap between the tube and the tube sheet. In essence the insert comprises a central axial portion 16 which contains a predetermined number of grains of explosive, generally from 25 grains per foot to 40 grains per foot, uniformly disposed along the insert axis. A known detonating fuse is used, consisting of grains of explosive embedded in a fiber or plastic body. Encompassing the axial portion, an annular tubular force transmitting portion 18 surrounds the center portion and has an enlarged concentric portion 20 intermediate the ends thereof.

A preferred transmitting medium is polyethylene, or another thermoplastic hardenable resin having essentially the same properties as polyethylene. Suitable mediums other than polyethylene are polyvinyl acetate, polyvinyl butyrals, polystyrene, nylon, Teflon, polyester resins, Delrin, Lexon, polypropylene and Tygon. These materials have essentially the same flexibility, formability, resiliency, and at least about as high a melting point as polyethylene.

The portion 20 is conical, with a substantially radial base forming a rim 22 making a narrow ring of contact with the inside surface of the tube. The portion 20 also makes an obtuse angle 24 of the order of 150° with the remainder of the tubular portion 18 at the smaller end of the conical portion 20. The tubular portion 18 also has a second enlarged portion 26 at one end thereof forming a stopper to enter the tube 12. This portion 26 also serves as a gauge for the depth of the first enlarged portion 20 within the tube 12.

As shown in FIG. 2 a tube was exploded without any tube sheet, and the tube 28 calipered at 0.772 inch had formed therein an annular bump 30 calipered at .782 inch, evidencing the localized expansion to take place in the confines of the tube sheet hole.

What is claimed is:
1. Apparatus for expanding a tube within a tube sheet comprising
   an insert;
   the insert comprising a central axial portion including a predetermined number of grains of explosive uniformly disposed along the axis of the insert;
   an annular tubular force transmitting portion encompassing the center portion;
   said annular tubular portion being a thermoplastic hardenable resin of the class consisting of polyethylene, and resins having essentially the same flexibility, formability, resiliency, density, and at least about as high a melting point as polyethylene and having a diameter substantially smaller than the diameter of the tube with an enlarged concentric portion making a narrow ring of contact with the inside surface of. the tube; and
   means to portion the insert within the tube whereby the length dimension thereof is coextensive with a major portion of the area of overlap between the tube and tube sheet.
2. Apparatus for expanding a tube within a tube sheet as claimed in claim 1, wherein the tube extends through the tube sheet and one end thereof is adjacent to one surface of the tube sheet.
3. Apparatus for expanding a tube within a tube sheet as claimed in claim 1, in which said enlarged portion is conical with a substantially radial base, and the sides of the cone make an obtuse angle of the order of 150° with the remainder of said tubular portion at the smaller end of said conical portion.
4. Apparatus for expanding a tube within a tube sheet as claimed in claim 1, in which said enlarged portion is intermediate the ends of said tubular portion, and said tubular portion has a second enlarged portion at one end thereof forming a stopper to enter said tube.
5. A method for expanding a tube within a tube sheet comprising the steps of
   positioning the tube within a tube sheet hole to define an area of overlap between the tube sheet and tube;

positioning a cylindrical explosive insert within the tube wherein the insert is coextensive with a major portion of the area of overlap;

the explosive insert including a central axial portion comprising a predetermined number of grains of explosive uniformly disposed along the axis of the insert, and an annular tubular force transmitting portion between the center portion and tube inside surface;

said force transmitting portion having a diameter substantially less than the diameter of the tube and having an enlarged concentric portion having an outside surface making a narrow ring of contact with the inside surface of the tube;

said force transmitting portion being a thermoplastic hardenable resin of the class consisting of polyethylene, and resins having essentially the same flexibility, formability, resiliency, density, and at least about as high a melting point as polyethylene; and detonating the explosive insert to expand the tube.

6. A method as claimed in claim 5 in which said force transmitting portion has a second enlarged portion at one end thereof forming a stopper to enter said tube, and and gauging the depth location of said first enlarged portion within the tube.

References Cited

UNITED STATES PATENTS

| 3,036,373 | 5/1962 | Drexelius | 29—421 |
| 3,113,518 | 12/1963 | Doan | 102—24 |
| 3,140,537 | 7/1964 | Popoff | 29—421 X |
| 3,153,848 | 10/1964 | Glyman et al. | 29—421 |
| 3,402,870 | 9/1968 | Carlson et al. | 228—3 |
| 3,409,969 | 11/1968 | Simons et al. | 228—3 X |
| 3,411,198 | 11/1968 | Berman et al. | 29—421 |
| 3,426,681 | 2/1969 | Oliver | 29—421 X |
| 3,430,323 | 3/1969 | Brown et al. | 29—470.1 X |

JOHN F. CAMPBELL, Primary Examiner

D. C. REILEY, Assistant Examiner

U.S. Cl. X.R.

29—421, 470.1; 102—24; 228—3